Oct. 25, 1949.  E. F. AUMULLER  2,485,552
GYROSCOPIC ARTIFICIAL HORIZON
Filed April 24, 1947
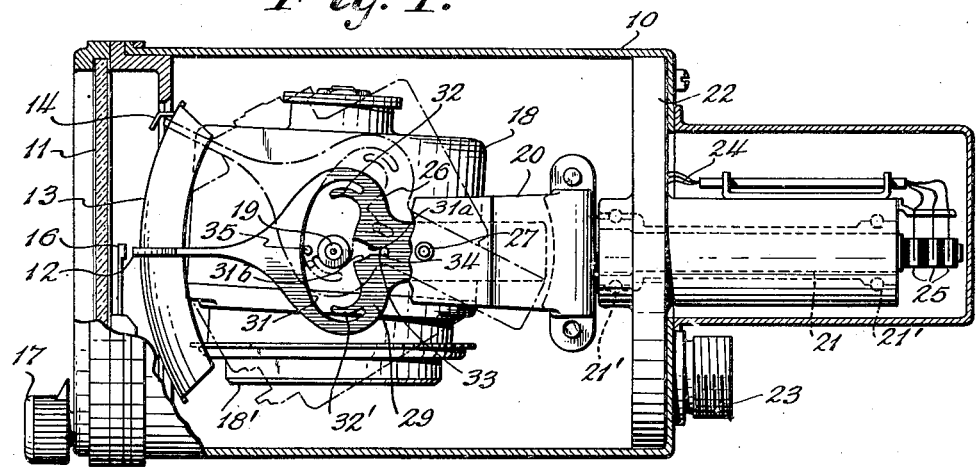
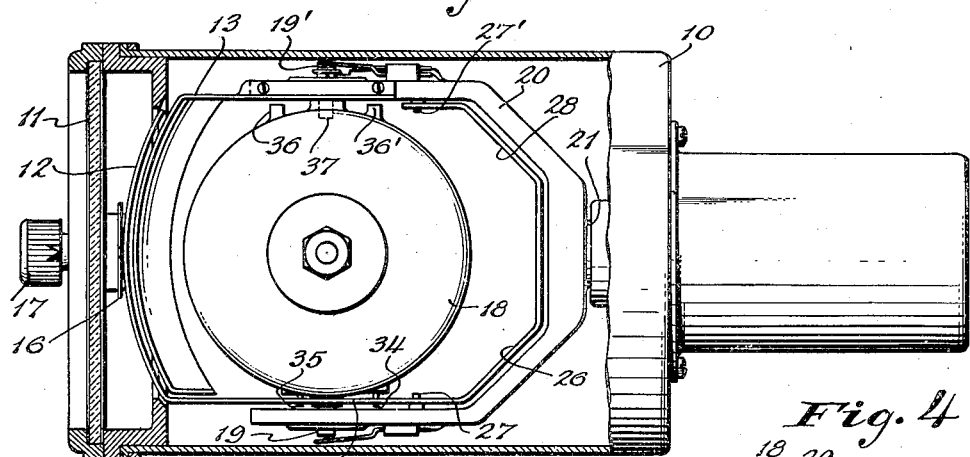
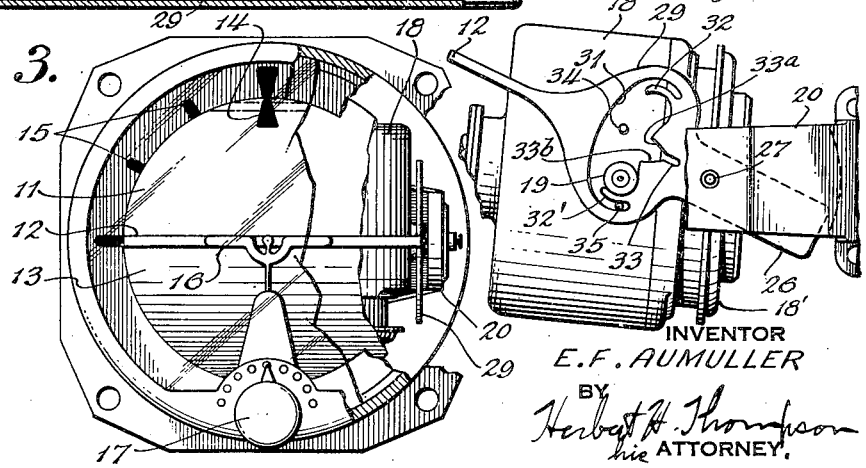
INVENTOR
E. F. AUMULLER
BY
Herbert H. Thompson
his ATTORNEY.

Patented Oct. 25, 1949

2,485,552

UNITED STATES PATENT OFFICE 2,485,552

GYROSCOPIC ARTIFICIAL HORIZON

Edward F. Aumuller, Lynbrook, N. Y., assignor to The Sperry Corporation, a corporation of Delaware Application April 24, 1947, Serial No. 743,651

8 Claims. (Cl. 33—204)

This invention relates generally to gyroscopic instruments for aircraft and has reference more particularly to artificial horizon or roll and pitch indicator gyroscopes. Heretofore the standard Sperry gyroscopic artificial horizon, which employs a horizon bar somewhat similar to that of my invention, has been only employed on gyro verticals of quite limited freedom and therefore was subject to tumbling in case the airplane exceeded the 40-50 degree limit angles in pitch or roll for which the instrument was designed. Recently a new type of gyro vertical has come into use, currently known as the attitude gyroscope, which is not subject to tumbling and therefore can be employed in aircraft under all conditions of maneuver without upsetting or going through gimbal lock, one type of which is shown in Patent No. 2,452,473 dated October 26, 1948 to Spencer Kellogg, 2nd. The type of indications currently employed on such attitude gyroscopes, however, have met with serious objections from aviators who are used to employing the standard gyroscopic artificial horizon indication which utilizes a bar stabilized horizontally to represent the horizon and gives an indication of both pitch and roll in the same direction that the horizon appears to move under such conditions, which is not true, in the type of indication heretofore used on attitude gyroscopes.

Heretofore gyroscopes of the attitude type employed a sphere fixed to the rotor case and having a meridian and parallels to indicate departure of the craft from level flight. In this type, the horizon indications are reversed, that is, for a nose down attitude of the craft the horizontal lines on the sphere move down which may indicate a nose up attitude of the craft if the pilot considers the horizontal lines to be an indication of the earth's horizon. However, the indications from the horizon index of the horizon bar of the present invention are the same as if the pilot were looking at the earth's horizon, that is, if the craft dives, the horizon index moves up and the miniature airplane fixed to the instrument would appear below the horizon thus indicating a nose down attitude of the craft. It will be understood of course that the horizon index which forms an integral part of the horizon bar may be a long, substantially narrow strip as shown in the embodiment illustrated, or a short pointer-like indicator, or any type of indicator of finite length.

The invention also refers to improvements in the pitch indicating members or horizon bars of gyroscopic horizon indicators, in the means for mounting the same on an instrument, and in the means for actuating said bars on the craft's departure from a predetermined norm. Heretofore, instruments of the gyro-horizon type have been fairly complex in mounting the horizon bar, and actuating the same. They have been mounted on the outside of the gimbal ring which necessitates slots cut in the gimbal ring, counterweights attached to the bars, and to balance the latter, still other weights are required on the opposite side of the gimbal ring. By my invention I have eliminated the complexities of prior gyro-horizon instruments by providing a novel horizon bar which is mounted on the inside of the gimbal ring, that is, between the gimbal ring and the rotor case, and is self-balanced about both its axes of movement. Also, to prevent the horizon bar from falling across the face of the instrument when the craft on which it is mounted goes through complex maneuvers, such as vertical climbs, dives and loops, I have provided locking means whereby the horizon bar is maintained in a fixed relation to the gimbal ring.

Therefore, the primary object of my invention is to provide a non-tumbling, non-gimbal lock type of gyroscope with an artificial horizon type of indication, i. e., with a horizon bar to indicate the departure of the craft from level flight but allows the rotor case thereof to move through extreme angles of pitch and roll independently of the horizon bar.

Another object of my invention is to provide an artificial horizon instrument wherein the horizon bar thereof is mounted interiorly of the gimbal ring so that there are no movable parts on the outside thereof, thereby providing a very compact gyro assembly, which may be fitted into a small housing.

Another object resides in the provision of a one-piece horizon bar which is balanced in itself not only about an athwartship axis but also about a fore and aft axis thus obviating the use of balance weights on the rear and sides of the horizon bar and gimbal ring.

Another object of my invention is to provide means for effectively locking the horizon bar with respect to the gimbal ring when the rotor case of the gyroscope moves beyond a predetermined angular position with respect to the gimbal ring.

Other objects and advantages of my invention will become apparent from the following detailed description of the preferred embodiment thereof shown in the accompanying drawings in which:

Fig. 1 is a side elevational view of the improved artificial horizon with the exterior housing in partial section;

Fig. 2 is a plan view of the same with the housing partially in section;

Fig. 3 is a face view of the instrument partially in section, and

Fig. 4 is a detail of the gyroscope in one of its limited positions of angular movement.

Referring now to Figs. 1-3, the gyroscopic instrument is shown as being enclosed in a housing 10 having a window 11 at the front end thereof through which the horizon index 12 is viewable. A curved background member 13 having a roll index 14 at the top thereof is secured to the gimbal of the instrument and is rotatable therewith. Index 14 cooperates with a fixed scale 15 to indicate the attitude of the aircraft in roll. Cooperating with the horizon index 12 is a miniature airplane 16 for indicating attitude in pitch and roll, the airplane 16 being vertically adjustable by knob 17 for trim purposes as is well-known in the art.

The gyroscope as a whole comprises a rotor (not shown) spinning about a substantially vertical axis within a rotor bearing case 18 which in turn has a pair of axis defining trunnions 19, 19' supported in suitable bearings in the arms of a substantially U-shaped open-ended gimbal ring 20 for oscillation about a normally transverse axis. The rotor forms the armature of an induction motor (not shown) energized from a source of voltage which is applied to the instrument through socket 23, leads 24 and slip rings 25. The rotor is shown as spinning about an axis which is slightly tilted from the true vertical to compensate for turn error as more fully described in United States Patent No. 2,409,659 of F. D. Braddon, issued on October 22, 1946, for Gyro verticals.

The rotor case 18 is maintained in a vertical position by an erection system 18'. The erection system shown is of the Cerini type and since it forms no part of the present invention, reference is made to copending application of Clare E. Barkalow, Serial No. 670,263 filed June 12, 1946.

Gimbal ring 20 has at its closed rear end an elongated trunnion 21 which is mounted for rotation about a fore and aft axis in spaced bearings 21' in a plate 22 mounted on the rear of the housing 10. The horizon bar 26 of the novel gyro-horizon indicator is mounted for oscillation between the open arms of gimbal 20 on spaced pivots. These pivots are in the form of a pair of pins 27, 27', which are mounted on the inside of each arm of the gimbal ring 20 substantially behind the trunnions 19, 19' and protrude just far enough to contact journals in the horizon bar 26.

The horizon bar 26 is formed of a thin integral strip of material such as aluminum or other comparatively light, rigid material which may be stamped to form a frame or open frame-like structure. The strip comprises generally, a frame having a side portion 29 of enlarged width as compared to the body of the strip, a front end portion of reduced width which is bent to form the laterally extending horizon index 12, and a rear end portion 28 which extends laterally from the side portion 29 and terminates in a spaced, substantially parallel relation thereto. The horizon bar 26 is mounted in the gimbal ring 20 by a pair of journals one on the side portion 29 cooperating with pin 27 and the other on the end portion 28 cooperating with pin 27'; thus forming a frame-like coplanar horizon bar which is generally polygonal in shape and is self-balancing about its pivotal support for all positions thereof relative to horizontal.

The enlarged side portion 29 of the horizon bar 26 has cut therein a substantially arcuate slot 31 which permits the trunnion 19 to pass therethrough. The slot 31 has a center of curvature coincident with the axis of rotation of the horizon bar 26, that is coincident with the axis defined by pins 27, 27' on the gimbal ring 20, whereby to permit the bar 26 to rotate without interference from the trunnion 19. A pair of curved projections 32—32' extend forwardly into the slot 31 and have a center of curvature coincident with the transverse axis defined by the trunnions 19, 19' when the bar 26 reaches one of its predetermined limits of angular movement. The operation of these projections will be fully explained below.

The enlarged side portion 29 of the horizon bar 26 also has cut therein a thin forwardly extending slot 33 diverging in two arcuate cam surfaces 31a, 31b into the slot 31, the surface 32 having a center of curvature coincident with axis of trunnions 19, 19' when the bar is at its upper limit of rotation, and surface 32' having the same center of curvature when the bar is at its lower limit of rotation. The operating means for the horizon bar 26 comprises a first pin 34 mounted on the rotor case 18 between the trunnion 19 and the pin 27 and projecting into slot 33, the pin 34 terminating in spaced relation to the inner surface of the gimbal ring 20. A second pin 35 also mounted on the rotor case 18 is cooperatively disposed within the arcuate slot 31 and is positioned in front of the trunnion 19, and also terminates in spaced relation to the inner surface of the gimbal ring 20. The pins 34 and 35 lie in a horizontal plane passing through trunnion 19.

The rotor case 18 is limited in its angular movement with respect to the gimbal ring 20 by a pair of high angle stops 36, 36' forming a part of the casing 18 and cooperable with a projection 37 on the gimbal ring 20. The stops 36, 36' and projection 37 are so positioned as to prevent "gimbal lock" and its accompanied reversal without causing tumbling. This feature forming no part of the present invention is explained more fully in the above-mentioned copending application No. 622,771 to Spencer Kellogg, 2nd, now Patent No. 2,452,473 granted Oct. 26, 1948.

The operation of the improved gyro horizon is as follows. Let us assume straight and level flight, in which case the rotor casing 18 is in a vertical position and pins 34 and 35 lie in a horizontal position relative to the gimbal ring 20. The horizon index 12 is in line with the miniature airplane 16 and the index 14 is centered as shown in Fig. 3. However, if the craft dives, the relation of the rotor case 18, horizon bar 26 and gimbal ring 20 is changed as indicated by dot and dash lines in Fig. 1. It is assumed of course that the rotor case 18 is actually maintained in a vertical position by erection system 18' and the housing 10 and gimbal 20 rotate around the transverse axis defined by trunnions 19, 19'. As the case tips forwardly with respect to the gimbal ring 20, the pin 34 will move upwardly, thereby carrying with it the horizon bar 26 through the cooperation of pin 34 in slot 33 in the usual manner. If, however, the craft dives at a steeper angle and the rotor case moves beyond a predetermined angle with respect to the gimbal ring 20 (in the embodiment shown about 30°), the pin 34 will move out of slot 33 and ride along the cam surface 31a. The cam surface 31a now having its center of curvature coincident with the axis of trunnions 19, 19' the bar being at its upper limit of rotation, it will be seen that there will be no further movement of bar 26 and the horizon index therefore will never move off the face of the curved background 13. At the time the pin 34 rides off of cam 31a, pin 35 engages the outer surface of arcuate projection 32' and since the projection now has its center of curvature coincident with the axis of trunnions 19, 19' as explained above, the pin 34 will impart no further movement to the horizon bar 26 and pin 35 effectively will lock it to the gimbal ring 20 for all further angular movements of the casing 18 beyond the above-mentioned predetermined angle. (See Fig. 4.) The cooperation between the projection 32' and pin 35 also prevents the bar 26 from falling across the face of the instrument as the gyro precesses about the fore and aft axis by the action of pin 36' and stop 37; this precession being fully explained in the above-mentioned Kellogg application.

If we now come out of the steep dive, the pin 35 will travel along the arcuate projection 32' until pin 34 engages cam surface 33a, at which time the pin 35 is disengaged from the projection 32'. As the levelling off continues, the pin 34 will ride along the cam surface 33a until it reaches the slot 33. At this time, the relative movement between gimbal 20 and horizon bar 26 is restored and as level flight is approached the pin 34 will move into the slot 33 and carry bar 26 downwardly until it is level with the minature plane 16.

Since many changes could be made in the above construction and many apparently widely different embodiments of this invention could be made without departure from the scope thereof, it is intended that all matter contained in the above description or shown in the accompanying drawings shall be interpreted as illustrative and not in a limiting sense.

What is claimed is:

1. In a gyroscopic flight instrument of the artificial horizon type for aircraft, the combination with a substantially U-shaped open-ended gimbal ring, of a horizon bar, and means for pivotally supporting said bar on the inner sides of said gimbal ring, said bar comprising an integral thin strip of rigid material having its forward portion transversely bent to form a horizon index extending transversely between the spaced arms of the gimbal ring and adjacent the open end thereof, and having its rear end transversely bent and extending transversely of said ring to form a substantially U-shaped rear end portion, said rear end portion substantially balancing said front end about said pivot means.

2. In a gyroscopic flight instrument of the artificial horizon type for aircraft, the combination with an open sided gimbal ring, of a rotor bearing case supported on said ring to rotate about a transverse axis, a frame-like, open-sided horizon bar having a transversely extending forward end portion defining a horizon index, side portions pivotally supported between said case and said gimbal, and a rear portion joining said side portions, the side and rear portions substantially conforming in configuration to said gimbal ring.

3. In a gyroscopic flight instrument of the artificial horizon type for aircraft, the combination with a U-shaped gimbal ring open at one end and supported to rotate about a fore and aft axis at its other end, a gyro rotor case supported on said gimbal ring to rotate about a transverse axis, a frame-like, open-sided horizon bar having a transversely extending forward end portion defining a horizon index viewable between the open ends of said gimbal ring, generally parallel side portions supported on the inner opposite sides of said gimbal ring to pivot adjacent thereto and about a transverse axis, and a rear portion joining said side portions, the sides and rear portions of said bar substantially conforming in configuration to said gimbal ring.

4. In a gyroscopic flight instrument of the artificial horizon type for aircraft, a substantially U-shaped, open-ended gimbal ring, a rotor case pivotally mounted between the open arms thereof for oscillation about a normally transverse axis, a horizon bar pivotally mounted therebetween for oscillation about an axis parallel to and substantially behind said transverse axis, a first pin on said case for actuating said bar, and a second pin on said case for locking said bar in substantially fixed relation to said gimbal ring when said case moves beyond a predetermined angular position with respect to said gimbal ring.

5. In a gyroscopic flight instrument of the artificial horizon type for aircraft, a substantially U-shaped, open ended gimbal ring, a rotor case pivotally mounted between the open arms thereof for oscillation about a normally transverse axis, a horizon bar pivotally mounted therebetween for oscillation about an axis parallel to and substantially behind said transverse axis, said bar having first and second slot portions therein, a first pin on said case cooperably disposed within said first slot portion for actuating said bar, and a second pin on said case cooperably disposed within said second slot portion for locking said bar in substantially fixed relation to said gimbal ring when said case moves beyond a predetermined angular position with respect to said gimbal ring.

6. In a gyroscopic flight instrument of the artificial horizon type for aircraft, a rotor and rotor bearing case, a gimbal in which said case is pivotally mounted on a transverse axis, an outer housing in which said gimbal is pivoted on a fore and aft axis, a horizon bar pivoted on a transverse axis on said gimbal behind said first axis, said bar having an enlarged central portion having an opening therein, a projection in said opening and a slot portion diverging into said opening, a first pin on said case cooperatively disposed within said slot portion for actuating said bar, a second pin in said case cooperably disposed within said opening and engageable with said projection whereby to lock said bar and said gimbal for all movements of said casing beyond said predetermined position.

7. In a gyroscopic flight instrument of the artificial horizon type for aircraft, the combination with an open-sided gimbal ring supported to rotate about a fore and aft axis, a gyro rotor case supported on said gimbal ring to rotate about a transverse axis, a horizon bar supported on the inner side of said gimbal ring to pivot adjacent thereto and about an axis parallel to and substantially behind said transverse axis, said bar having an enlarged central portion having an opening therein, an arcuate projection in said opening, a pin on said case cooperatively disposed within said opening and engageable with said projection when said case moves beyond a predetermined angular position to said gimbal ring whereby to lock said bar to said gimbal for all movements of said case beyond said predetermined position.

8. As a new article of manufacture, a horizon bar for a gyroscopic artificial horizon formed of a thin integral strip of material extending longitudinally in a generally polygonal fashion and comprising a first side provided with means adapted pivotally to support said bar on one side of a gimbal ring and, when so supported, generally to parallel said one side of the ring, a laterally extending portion of reduced width contiguous the front end of said first side of said bar and forming the horizon index, the rear end of said first side being contiguous with a rear portion extending laterally therefrom and terminating in an end portion extending in spaced, substantially parallel relation to said first side, said end portion being provided with means adapted pivotally to support said bar on a side of said gimbal ring opposite to that first above-mentioned, said pivot support means being transversely opposite each other and so positioned as to provide substantially equal masses of said bar on opposite sides of said pivotal supporting means, whereby to provide a horizon bar substantially balanced about its pivotal support for all positions thereof relative to horizontal.

EDWARD F. AUMULLER.

REFERENCES CITED

The following references are of record in the file of this patent:

UNITED STATES PATENTS

| Number | Name | Date |
|---|---|---|
| 1,982,851 | Bassett et al. | Dec. 4, 1934 |
| 2,059,266 | Nesbitt | Nov. 3, 1936 |
| 2,128,956 | Moss | Sept. 6, 1938 |
| 2,333,983 | Carlson | Nov. 9, 1943 |
| 2,409,659 | Braddon | Oct. 22, 1946 |

FOREIGN PATENTS

| Number | Country | Date |
|---|---|---|
| 850,087 | France | Sept. 4, 1939 |